Oct. 13, 1970   W. LEHMANN   3,534,211
CATHODE-RAY DEVICE WHICH INCORPORATES HIGH-SPEED PHOSPHORS
Filed Oct. 3, 1967
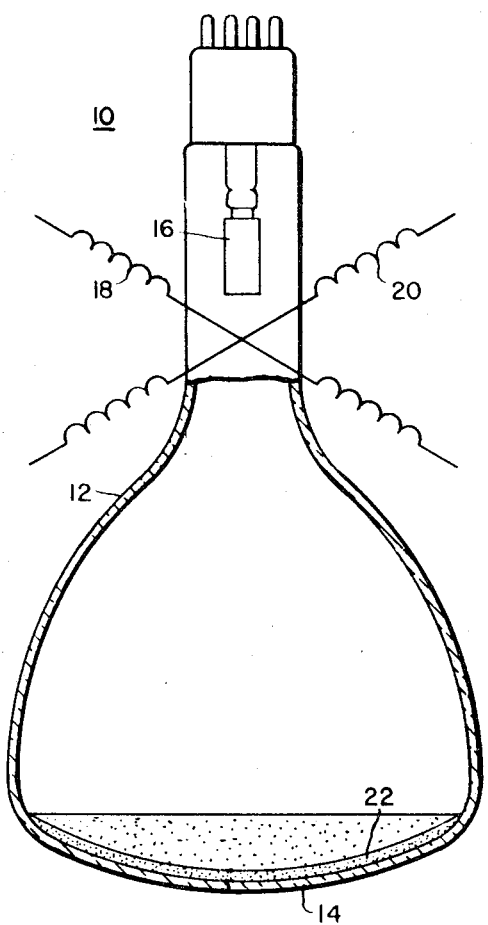
WITNESSES:
Leon M. Garman
James F. Young
INVENTOR
Willi Lehmann
BY W. D. Palmer
ATTORNEY 3,534,211
CATHODE-RAY DEVICE WHICH INCORPORATES
HIGH-SPEED PHOSPHORS
Willi Lehmann, Murrysville, Pa., assignor to Westinghouse Electric Corporation, Pittsburgh, Pa., a corporation of Pennsylvania
Filed Oct. 3, 1967, Ser. No. 672,493
Int. Cl. C09k 1/10; H01j 29/20
U.S. Cl. 313—92        4 Claims

ABSTRACT OF THE DISCLOSURE

High-speed phosphor is zinc oxide or zinc-cadmium oxide doped with aluminum, gallium, or indium. Each atom of dopant contributes approximately one free electron to the conductivity of the phosphor and due to the elimination of traps, the phosphor has very rapid decay characteristics which are estimated to be in the order of $10^{-10}$ second. In the preferred mode of preparation, the phosphor is fired in hydrogen to cause the fired material, when cooled, to display substantially a maximum possible value of electrical conductivity. Among the special applications for such phosphor are cathode-ray devices.

CROSS-REFERENCES TO RELATED APPLICATIONS

In co-pending application Ser. No. 672,494, filed concurrently herewith by the present applicant is disclosed a high-speed phosphor and method, as well as a cathode-ray device, wherein the phosphor is cadmium sulfide or modified cadmium sulfide doped with aluminum, gallium or indium. While the matrix material of this cadmium sulfide phosphor is different from the present phosphor, the method of preparation is quite similar.

BACKGROUND OF THE INVENTION

This invention broadly relates to high-speed phosphors and, more particularly, to cathode-ray devices which incorporate a particular high-speed phosphor, the high-speed phosphor composition, and the method for preparing same.

Phosphors which have a very rapid decay time are known as high-speed phosphors. Such materials have use in flying-spot scanners, control phosphors in color television tubes, scintillation counters, and experimental or manufacturing control phosphors such as might be used to determine a transit time and spread for photomultiplier tubes, to name a few of the applications.

Zinc oxide phosphor materials are well known in the art and respond to excitation by ultraviolet or cathode rays, for example, to emit primarily in two emission bands, a broad band in the green region of the visible spectrum, and the so-called "edge-emission" which for this phosphor is relatively narrow band in the near ultraviolet with a peak at about 390 nm. The green emission for such phosphors is normally obtained by firing zinc oxide under slightly reducing conditions. The so-called "edge-emission" of this material has been reported to be obtained by firing pure zinc oxide under oxidizing conditions, see Leverenz, "An Introduction to Luminesce of Solids," published by Wiley, 1950, page 218. The green emission of the zinc oxide which is fired under the slightly reducing conditions is obtained under excitation with ultraviolet or cathode rays and the decay time is usually in the order of $1 \times 10^{-6}$ second. The foregoing ultraviolet edge-emission of pure zinc oxide which is fired under oxidizing conditions is not readily obtainable at room temperature unless the phosphor is excited by very high energy cathode rays and, even then, the response of the phosphor is comparatively weak. The decay time of this phosphor is reported to be about $2 \times 10^{-6}$ second by D. Hahn and K. Lertes in Z. Phys., 170, 367 (1962) and about $10^{-7}$ second by Leverenz at page 294 in "Luminescence of Solids," Wiley and Sons, New York (1950).

In explanation of the term "edge emission," this can be defined as a phosphor emission which occurs at a wavelength which is only slightly longer than the long wavelength "edge" of the phosphor absorption spectrum.

The decay time is the primary factor in determining the so-called speed of the phosphor, since the speed of initial response of the phosphor to excitation is at least as fast as the speed at which the emission decays after excitation is removed, and is normally faster. The phosphor decay time as measured herein is that period of time required for the phosphor brightness to decay from a maximum value to a value which is 37% of the maximum value.

The term dope or dopant as used herein refers to a donor impurity which constitutes a lattice defect that is able to supply at least one free electron into the conduction band, or alternatively, an impurity that enhances the n-type conductivity of the material.

SUMMARY OF THE INVENTION

It is the general object of the present invention to provide a phosphor material which has an extremely high speed.

It is a further object to provide a cathode-ray device incorporating a phosphor which has an extremely high speed.

It is another object to provide a method for preparing a phosphor material which has an extremely high speed.

The foregoing objects of the invention, and other objects which will become apparent as the description proceeds, are achieved by providing a phosphor composition having a matrix of zinc oxide or zinc-cadmium oxide wherein the gram-atom ratio of zinc to cadmium is at least 9:1. This matrix is doped with predetermined amounts of aluminum, gallium or indium. Due to the conditions of preparation, the electrical conductivity of the phosphor is substantially at a maximum possible value, because of the substantial elimination of all traps in the phosphor. There is also provided a cathode-ray device which incorporates such a phosphor as well as a method for preparing the phosphor.

BRIEF DESCRIPTION OF THE DRAWING

For a better understanding of the invention, reference should be made to the accompanying drawing wherein the sole figure is a plan view, partly in section, of the cathode-ray device incorporating a phosphor screen which comprises the very high-speed phosphor of the present invention.

DESCRIPTION OF THE PREFERRED EMBODIMENTS

To prepare the present phosphor there is mixed together Group II–B metal compound of zinc or zinc plus cadmium wherein the gram-atom ratio of zinc to cadmium in the compound is at least 9:1, and Group III–A metal compound of aluminum, gallium, indium or mixtures thereof in such amount that the ratio of total gram-atoms of Group III–A metal to Group II–B metal present in the mixture is from 0.0001 to 0.05. The compound of the foregoing Group II–B metal is the oxide or a compound which readily decomposes to the oxide on heating, and the compound of Group III–A metal is the oxide or a compound which readily decomposes to the oxide on heating.

The foregoing mixed compounds are fired in an oxidizing atmosphere at a temperature of from about 800° C. to about 1000° C. for at least about one half hour.

Thereafter, the first fired material is refired either in a hydrogen atmosphere or in an atmosphere of zinc vapor at a temperature of from about 550° C. to about 700° C. for a sufficient period of time to cause the resulting fired material to display substantially that maximum possible value of electrical conductivity as is permitted by the amount of the aluminum, gallium, or indium in the phosphor.

EXAMPLE I

As the first example, 3.75 grams of $Al(NO_3)_3 \cdot 9H_2O$ is dissolved in 100 ml. of water, which provide an aluminum concentration of $10^{-4}$ gram-atomic weight per ml. Thirty ml. of this solution are added to 81.4 grams (1 gram mole) of pure zinc oxide powder and the mixture thoroughly agitated as a slurry, and then dried. The dried powder is placed in a quartz container and fired in air at a temperature of from about 800° C. to 1000° C. for approximately one hour. The resulting first-fired material at best is very poorly luminescent. This first-fired material is refired in flowing hydrogen gas at a temperature of 600° C. to 700° C. for approximately 30 minutes. After cooling, the resulting phosphor displays an "edge-emission" having a peak at about 390 mm. when excited by 365 nm. ultraviolet, or by cathode rays. The phosphor has a speed of response, i.e., a decay time, which is so rapid that it could not be measured by available apparatus, which was limited to measuring a decay time of no less than about $5 \times 10^{-9}$ second. It is estimated that the decay time of the phosphor is in the order of about $10^{-10}$ second.

EXAMPLE II 159 milligrams of dry aluminum oxide powder are mixed with 81.4 grams of dry zinc oxide powder by means of ball milling. Thereafter, the raw mix is prefired and then fired in flowing hydrogen gas in the manner as described in Example I. The resulting phosphor is identical to that achieved under Example I.

EXAMPLE III 700 milligrams of gallium metal are dissolved in hot nitric acid, the excess acid is boiled off, and the resulting solution then diluted to 100 ml. Thirty ml. of this solution (which corresponds to $10^{-4}$ gram atomic weight of gallium per ml.) are added to 81.4 grams of zinc oxide powder and the raw mix constitutents are formed into a uniform slurry and then dried. Thereafter, the firing procedure is that which is described in foregoing Example I and the luminescence of the resulting phosphor is substantially identical to that reported under Example I.

EXAMPLE IV

Aluminum is added either as a dry oxide or as a compound in solution, as per the foregoing examples, to pure zinc oxide. The mixture is prefired in accordance with the foregoing examples. The prefired material is then enclosed in a quartz tube to which is added approximately 100 to 200 milligrams of zinc metal. The tube is evacuated and sealed off. The entire tube is then fired at a temperature of approximately 700° C. for approximately 30 minutes so that the actual firing atmosphere for the phosphor raw mix constitutes an atmosphere of zinc vapor. After cooling, the phosphor is substantially identical to that reported under Example I.

In the foregoing examples,, the concentrations of aluminum, gallium, indium, or any mixtures thereof, in compound form, may vary between about 0.0001 to 0.05 gram atom per gram atom of total zinc plus cadmium in the phosphor matrix. The preferred dopant is aluminum or gallium or mixtures thereof present in amount of about 0.003 gram atom per gram atom of total zinc in the phosphor matrix.

While the foregoing examples all relate to finely divided or powder phosphor, the present phosphor can also be formed as a thin film. As an example, metallic zinc or zinc telluride is evaporated as a thin film onto a substrate. The evaporated and deposited zinc or zinc telluride is then converted to the oxide by heating in air. The dopant is preferably co-deposited as a metal with the matrix compound and then converted to the oxide. After conversion to the oxide, the film is heated in the hydrogen or zinc vapor atmosphere in the manner as described hereinbefore.

The final firing procedure in the hydrogen atmosphere or the atmosphere of zinc vapor, at a temperature of from about 550° C. to about 700° C. should be conducted for a sufficient period of time to cause the resulting fired material to display substantially that maximum possible value of electrical conductivity as is permitted by the amount of the dopant in the matrix. In explanation of this conductivity, the final firing under the specified conditions causes the total zinc plus cadmium in the matrix to exceed that amount which is required to form the stoichiometric oxide, and apparently this serves to fill all traps on the matrix, thereby accounting for the extremely fast decay since the traps account for the phosphorescence or after-glow. As a result, substantially each atom of the dopant in the phosphor contributes one free electron to the electrical conductivity of the phosphor. This is best illustrated by the results reported in the following Table I:

TABLE I

[Influence of hydrogen firing atmosphere on electrical powder resistance [1] and on color or emission of photoluminescence at room temperature]

| | No dopant added | | 0.3% Ga added | |
|---|---|---|---|---|
| | Ohms | Color | Ohms | Emission |
| Hydrogen atmos. during refiring at 700° C | 120,000 | Dead | 5 | Near UV with violet tail. |
| No refiring | 300,000 | Weak green. | 2,500 | Dead. |

[1] Measured with 1.5 volts D.C. applied to a powder layer of 1 cm.² area and 1 mm. thickness pressed between two brass electrodes.

The foregoing measurements are of a qualitative nature since the measurement of electrical resistance of a bulk powder is not very reliable. The foregoing results clearly indicate, however, the vast difference in electrical conductivity which is obtained using the hydrogen firing atmosphere in contrast to the elimination of the hydrogen refiring. The measured conductivity will vary with the amount of dopant which is included within the specified ranges. To illustrate, the calculated value of conductivity for non-particulate (i.e., solid) zinc oxide doped with the minimum specified amount of 0.0001 gram-atom per gram-atom of zinc is about 2 mhos, and the calculated value of conductivity for the maximum dopant amount of 0.05 gram-atom is about $10^{-3}$ mhos.

In the foregoing examples, the zinc can be replaced by cadmium oxide in such amount that the gram-atom ratio of zinc to cadmium is at least 9:1. The zinc oxide in the raw mix could be replaced by a compound which readily decomposes to the oxide on heating, such as the nitrate. Also, the doping compounds can be mixed in any relative proportions in the foregoing examples.

With specific reference to the form of the invention illustrated in the sole figure of the drawing, the numeral 10 illustrates a cathode-ray device which is generally of conventional construction and comprises an evacuated envelop 12 including a faceplate 14. An electron gun 16 is positioned within the neck portion of the envelope 12 and the device is provided with a conventional electron deflecting means, illustrated diagrammatically as deflecting coils 18 and 20. A phosphor screen 22 is positioned between the faceplate 14 and the electron gun 16 and this phosphor screen comprises the high-speed phosphor of the present invention. It should be clear that the tube 10 as illustrated is only shown in diagrammatic form and that the present high-speed phosphor can be used equally well in a color television tube as a control phosphor, in which case the present phosphor would be used in conjunction with conventional color T.V. tube phosphors, shadow mask, plural guns, etc.

The present phosphor also has application in flying spot scanners and scintillation counters and because of the extremely fast decay time, there exist many other uses for this phosphor.

It will be recognized that the objects of the invention have been achieved by providing a phosphor composition which has an extremely fast rate of decay as well as a method for making such a phosphor. There is also provided a cathode-ray device which incorporates such a high-speed phosphor.

I claim as my invention:

1. A cathode-ray device comprising:
   (a) an evacuated envelope including a faceplate;
   (b) electron-gun means spaced from said faceplate within said envelope; and
   (c) a phosphor screen positioned between said faceplate and said electron-gun means, and said phosphor screen comprising a high-speed phosphor composition which emits primarily in the near ultraviolet and has a matrix of zinc oxide or zinc-cadmium oxide wherein the gram-atom ratio of zinc to cadmium is at least 9:1, said matrix is doped with aluminum, gallium, indium or mixtures thereof in amount of from 0.0001 to 0.05 gram-atom per gram-atom of total zinc plus cadmium in said matrix, and the electrical conductivity of said phosphor being substantially at that maximum possible value as is permitted by the amount of said dope in said phosphor.

2. The cathode-ray device as specified in claim 1, wherein the total zinc plus cadmium in said matrix exceeds that amount required to form stoichiometric oxide.

3. The cathode-ray device as specified in claim 1, wherein substantially each atom of said dopant in said phosphor composition contributes one free electron to the electrical conductivity of said phosphor.

4. The cathode-ray device as specified in claim 1, wherein said dopant is aluminum or gallium or mixtures thereof present in amount of about 0.003 gram-atom per gram-atom of total zinc plus cadmium.

References Cited

UNITED STATES PATENTS

| | | | |
|---|---|---|---|
| 2,529,711 | 11/1950 | Smith | 252—301.6 |
| 2,887,632 | 5/1959 | Dalton | 252—301.6 |
| 3,089,850 | 5/1963 | Cyr et al. | 252—501 |
| 3,130,341 | 4/1964 | Johnson | 313—92 |

HELEN M. McCARTHY, Primary Examiner

R. D. EDMONDS, Assistant Examiner

U.S. Cl. R.X.

252—301.6